United States Patent
Duarte et al.

(10) Patent No.: US 9,304,822 B2
(45) Date of Patent: Apr. 5, 2016

(54) RESOURCE CONFIGURATION FOR A NETWORK DATA PROCESSING SYSTEM

(75) Inventors: Mario J. F. Duarte, Dublin (IE); Mette F. M. Hammer, Dublin (IE); Michael Lynch, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 13/483,519

(22) Filed: May 30, 2012

(65) Prior Publication Data

US 2013/0326031 A1 Dec. 5, 2013

(51) Int. Cl.
G06F 15/177 (2006.01)
G06F 9/50 (2006.01)
H04L 12/24 (2006.01)

(52) U.S. Cl.
CPC .......... *G06F 9/5011* (2013.01); *H04L 41/0803* (2013.01)

(58) Field of Classification Search
CPC ...................................................... G06F 15/16
USPC ......................................................... 709/224
See application file for complete search history.

(56) References Cited

U.S. PATENT DOCUMENTS

| | | |
|---|---|---|
| 6,272,531 B1 | 8/2001 | Shrader |
| 6,718,358 B1 | 4/2004 | Bigus et al. |
| 7,363,370 B2 | 4/2008 | Collazo |
| 7,490,234 B2 | 2/2009 | Liu et al. |
| 7,721,292 B2 | 5/2010 | Frasier et al. |
| 7,840,652 B2 | 11/2010 | Schran et al. |
| 8,725,844 B2 | 5/2014 | Goin et al. |
| 2003/0135609 A1* | 7/2003 | Carlson et al. ................ 709/224 |
| 2004/0028003 A1 | 2/2004 | Diener et al. |
| 2004/0205167 A1 | 10/2004 | Grumann |
| 2005/0097517 A1 | 5/2005 | Goin et al. |
| 2005/0144267 A1 | 6/2005 | Maron |
| 2008/0177977 A1 | 7/2008 | Branda et al. |
| 2009/0037879 A1 | 2/2009 | Iyengar et al. |
| 2010/0180255 A1 | 7/2010 | Chung et al. |
| 2010/0257518 A1 | 10/2010 | Baratti et al. |
| 2011/0231899 A1* | 9/2011 | Pulier et al. ....................... 726/1 |
| 2012/0124363 A1 | 5/2012 | Dietrich et al. |

(Continued)

FOREIGN PATENT DOCUMENTS

EP 2187567 A1 5/2010
JP 4267819 A 9/1992

OTHER PUBLICATIONS

Notice of Allowance, dated Apr. 24, 2015, regarding U.S. Appl. No. 13/585,116, 7 pages.

(Continued)

*Primary Examiner* — David Lazaro
*Assistant Examiner* — Zia Khurshid
(74) *Attorney, Agent, or Firm* — Yee & Associates, P.C.; David Woycechowsky

(57) ABSTRACT

A method and apparatus for managing a service is disclosed. A program system running on a computer system in a network data processing system identifies the service on the computer system and a set of resources used by the service. The program system collects information about the service and the set of resources used by the service. The program system uses the information collected to identify a change to a configuration for the service which will increase performance of the service. The program system then makes the identified change to the configuration for the service.

8 Claims, 12 Drawing Sheets

(56) References Cited

U.S. PATENT DOCUMENTS

2013/0326032 A1 12/2013 Duarte et al.
2014/0047341 A1 2/2014 Breternitz et al.

OTHER PUBLICATIONS

Office Action, dated Oct. 6, 2014, regarding U.S. Appl. No. 13/585,116, 18 pages.

Kon et al, "Dynamic Resource Management and Automatic Configuration of Distributed Componenet Systems", COOTS 2001 Proceedings of the 6th Conference on USENIX Conference on Object-Oriented Technologies and Systems—vol. 6, Feb. 2001, 16 pages, [Retrieved from Internet on Aug. 29, 2011] http://srg.cs.uiuc.edu/2k/papers/Internal/coots01/FabioKon.pdf.

Mell et al., "The NIST Definition of Cloud Computing (Draft)," Recommendations of the National Institute of Standards and Technology, Special Publication 800-145, U.S. Department of Commerce, Jan. 2011, 7 pages.

Pacific Controls Gbots, "Gbots are intelligent, autonomous and cognitive software agents which are distributed via the Galaxy platform," Copyright 2011, 1 page, [Retrieved from internet on Aug. 29, 2011] http://www.g-bots.com/gbots-profile.html.

Pacific Controls Gbots, "Computer and computer programs are becoming an integral part with strategic decision," Copyright 2011, 1 page, [Retrieved from Internet on Aug. 29, 2011] http://www.g-bots.com/why-gbots.html.

Pacific Controls Gbots, "Gbots engage in complex and frequent patterns of two-way communication," Copyright 2011, 1 page, [Retrieved from Internet on Aug. 29, 2011] http://www.g-bots.com/features.html.

Pacific Controls Gbots, "The middle bots will stitch the communication between multiple agents in often dynamic environments," Copyright 2011, 2 pages, [Retrieved from Internet on Aug. 29, 2011] http://www.g-bots.com/concept-technology.html.

Kon et al., "Design, Implementation, and Performance of an Automatic Configuration Service for Distributed Component Systems", Software-Practice and Experience, http://citeseerx.ist.psu.edu/viewdoc/download?doi=10.1.1.69.4746&rep=rep1&type=pdf, Published in 2004; vol. 34:1-39, 37 pages.

"Autosys: Performance Driven Automatic System Configuration Tool", Association for Computing Machinery, http://people.apache.org/~deepal/resources/autosys.pdf, Copyright 2010, 6 pages.

Duarte et al., "Resource Configuration for a Network Data Processing System," U.S. Appl. No. 13/585,116, filed Aug. 14, 2012, 57 pages.

* cited by examiner

RESOURCE CONFIGURATION FOR A NETWORK DATA PROCESSING SYSTEM

BACKGROUND

1. Field

The disclosure relates generally to a network data processing system and, in particular, to configuring resources in the network data processing system. Still more particularly, the present disclosure relates to a method and apparatus for configuring resources in a network data processing system using bots.

2. Description of the Related Art

Cloud computing involves the delivery of computing resources as a service instead of a product. Resources such as hardware, software, and information are provided to users over a network such as the Internet. Cloud computing provides users access to resources without requiring the users to have knowledge of the physical location and configuration of the system providing the services.

Providers of cloud computing resources often deliver applications via the Internet. These applications are accessed from a web browser. The software and information used by the users are typically stored at server computers on a remote location.

As new services are offered, or as the capacity for current resources are increased, the provider installs these services on server computers. For example, database services, hypertext transfer protocol services, and other types of service may be installed on computers in a cloud computing system. These services are typically installed with a default configuration that allows a particular service to run using a minimum amount of resources. These default configurations, however, may not be the optimal configuration for providing a desired level of performance by a particular service.

Currently, system engineers examine a service running on a computer to identify and solve performance issues. This type of trouble-shooting to increase performance of a service often requires the user to be a subject matter expert in software performance and configuration. This type of management of services increases performance of those services. The increase in performance, however, is often more labor-intensive and expensive than desired.

Therefore, it would be advantageous to have a method and apparatus that takes into account at least some of the issues discussed above, as well as possibly other issues.

SUMMARY

In one illustrative embodiment, a method, apparatus, and computer program product for managing a service is provided. A program system running on a computer system in a network data processing system identifies the service on the computer system and a set of resources used by the service. The program system collects information about the service and the set of resources used by the service. The program system uses the information collected to identify a change to a configuration for the service which will increase performance of the service. The program system then makes the identified change to the configuration for the service.

DETAILED DESCRIPTION

Figure 1:
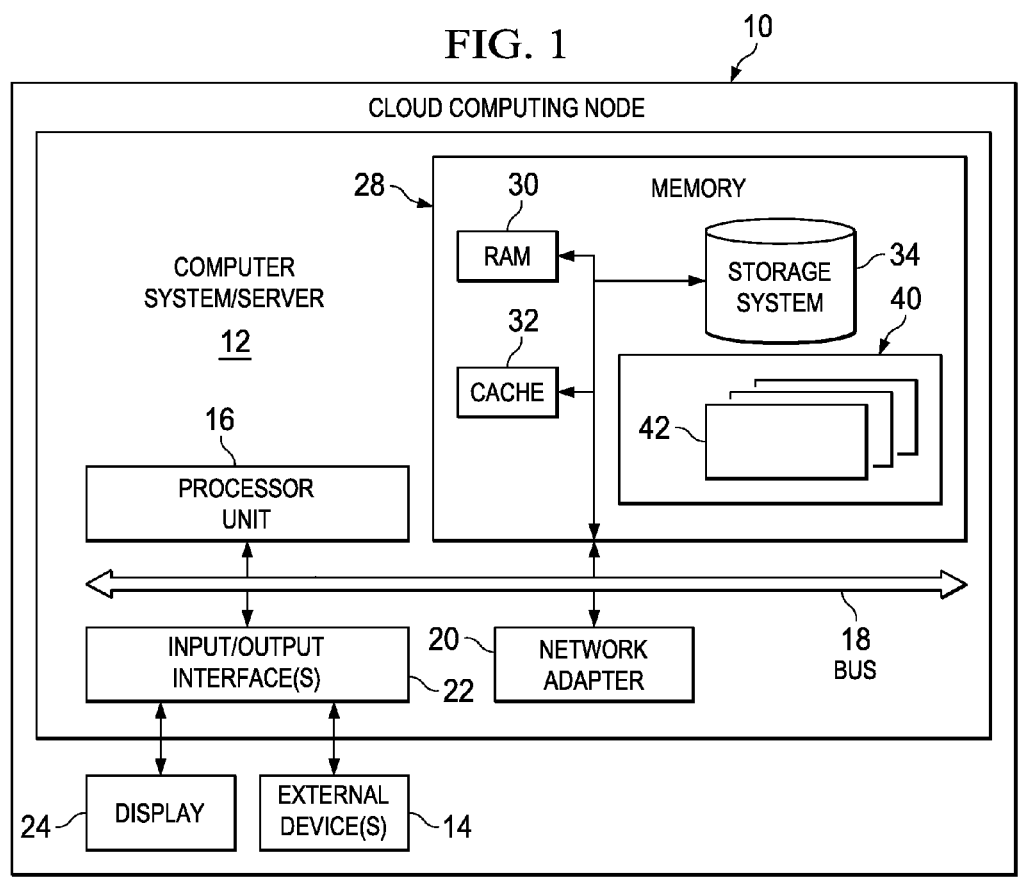
FIG. 1 is an illustration of a cloud computing node in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported which provides transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an illustration of a cloud computing node is shown in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being run by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, memory 28, and bus 18 that couples various system components including memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
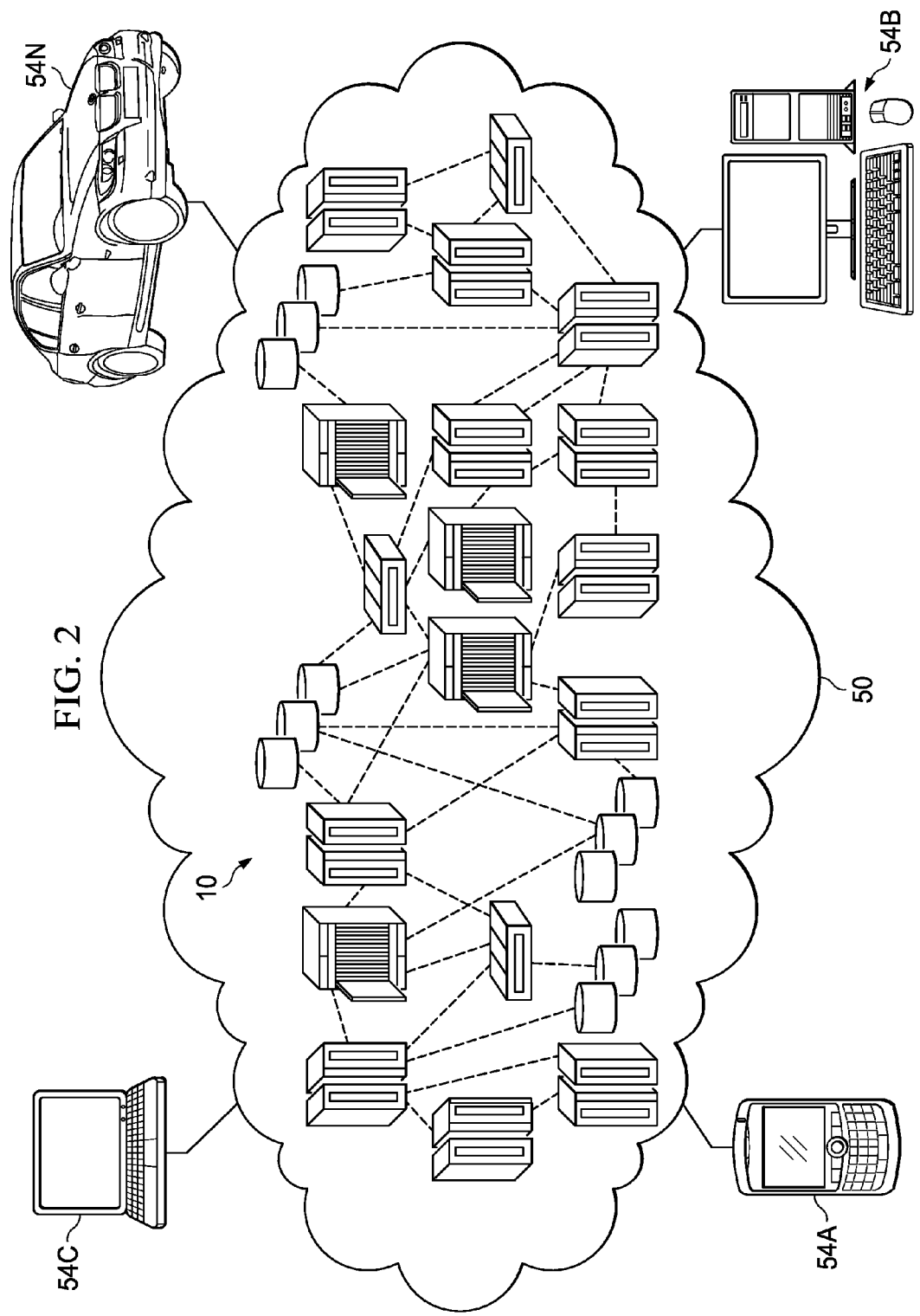
FIG. 2 is an illustration of a cloud computing environment in accordance with an illustrative embodiment.

Referring now to FIG. 2, an illustration of a cloud computing environment 50 is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
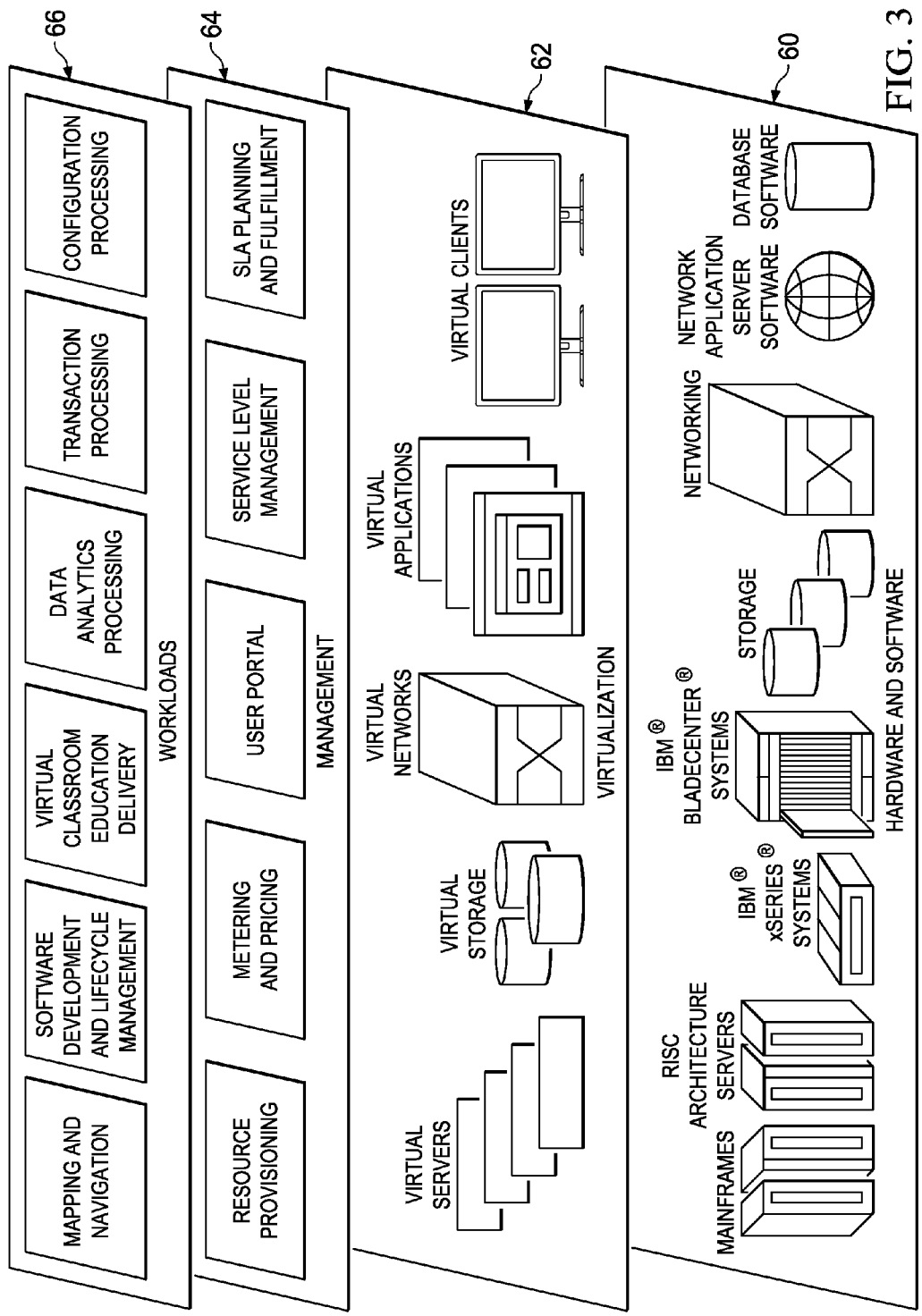
FIG. 3 is an illustration of a set of functional abstraction layers of a cloud computing environment in accordance with an illustrative embodiment.

Referring now to FIG. 3, an illustration of a set of functional abstraction layers provided by cloud computing environment 50 (FIG. 2) is shown in accordance with an illustrative embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; and networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and configuration processing.

The different illustrative embodiments recognize and take into account a number of different considerations. For example, the different illustrative embodiments recognize and take into account that many different types of resources are used by a service. For example, a service in a network data processing system may have different processes or threads that use some amount of resources. These resources include processor time, memory, storage, network ports, and other services.

The different illustrative embodiments also recognize and take into account that the actual use, by a first service, of resources in a server computer may not be the only factor limiting performance. For example, if the first service uses a second service to process requests from a user, the configuration of the second service may affect the performance of the first service. In yet another example, the second service may access a third service to process requests from the first service. The configuration of the third service may affect the performance of the second service in processing requests for the first service. As can be seen, other services involved in processing requests from the first service may affect the performance of the first service.

Thus, one or more illustrative embodiments provide a method and apparatus for managing a service in a network data processing system. In one example, a program runs in a computer system and identifies the service on the computer system in the network data processing system. The program identifies a set of resources used by the service. The program collects information about the service and the set of resources. The program identifies a change to the configuration for the service to increase performance of the service in which the changes are identified using the information collected by the program.

Figure 4:
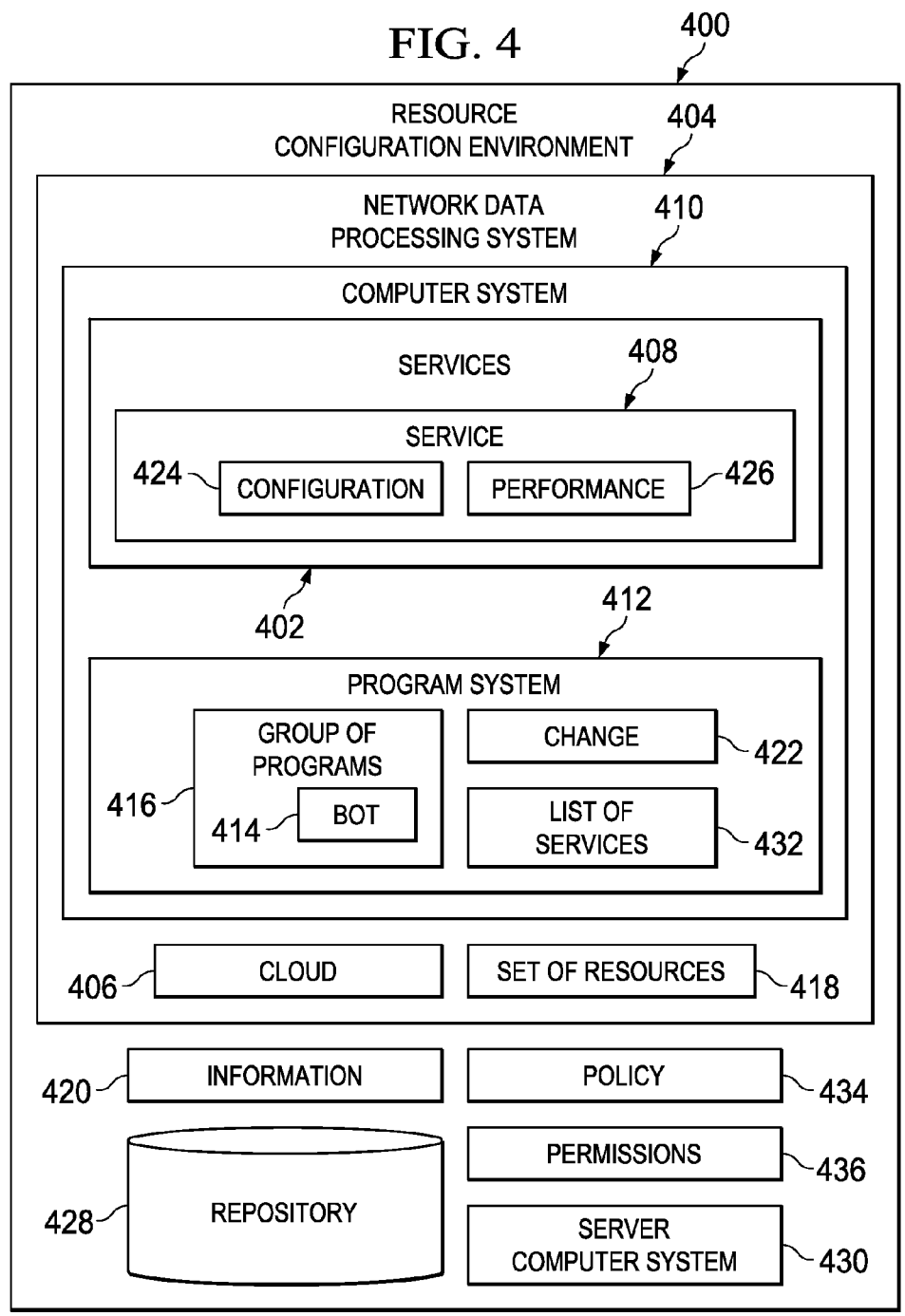
FIG. 4 is an illustration of a resource configuration environment in accordance with an illustrative embodiment.

Turning now to FIG. 4, an illustration of a resource configuration environment is depicted in accordance with an illustrative embodiment. Resource configuration environment 400 is an example of an environment that may be present in different types of computing systems. For example, resource configuration environment 400 may be included in computer system/server 12 in FIG. 1 on a cloud computing node such as cloud computing nodes 10 in cloud computing environment 50 in FIG. 2. In particular, resource configuration environment 400 may provide configuration processing in workloads layer 66 in FIG. 3.

As depicted, services 402 in network data processing system 404 may be managed in resource configuration environment 400. In this illustrative example, network data processing system 404 may take the form of cloud 406. Cloud 406 may include one or more computer systems such as computer system/server 12 on cloud computing nodes 10 in cloud computing environment 50 in FIG. 2.

In this example, a program system analyzes service 408 in services 402 to determine whether changes can be made to improve the performance of service 408. Service 408 may be selected for analysis in a number of different ways.

For example, service 408 may be selected because service 408 is a newly installed service and a default configuration for service 408 may not provide a desired level of performance. In another illustrative example, service 408 may be selected because service 408 is on a computer system in which changes have been made. Service 408 may be selected because service 408 is used by another service.

In this illustrative example, service 408 runs on computer system 410 in network data processing system 404. Computer system 410 is a hardware computer system rather than a virtual computer system in these illustrative examples. Of course, computer system 410 may include virtual computers, depending on the particular implementation.

Program system 412 runs on computer system 410. A set as used herein with reference to items mean one or more items. For example, set of bots 412 is one or more bots. A bots is a software application that runs automated tasks in network data processing system 404. Program system 412 identifies a presence of service 408 on computer system 410. Program system 412 is configured to run on computer system 410 without needing input from another program or a human user. In this illustrative example, program system 412 may take the form of bot 414. Bot 414 may be a software application that runs on automated tasks in network data processing system 404.

Program system 412 comprises group of programs 416. A "group" as used herein, with reference to items, means one or more items. For example, "group of programs 416" is one or more programs. Group of programs 416 is configured to run independently. In other words, group of programs 416 for program system 412 is configured to run without requiring input from another program or human user. As a result, program system 412 may be autonomous in performing operations within resource configuration environment 400.

As depicted, program system 412 identifies set of resources 418 used by service 408. A "set" as used herein with reference to items, means one or more items. For example, "set of resources 418" is one or more resources. Set of resources 418 can be software, hardware, or a combination of the two. In these illustrative examples, set of resources 418 may be services on computer system 410 or on another computer system in network data processing system 404. Service 408 may be affected by other services on computer system 410 or other computer systems in network data processing system 404. For example, other services may also be using set of resources 418. In these illustrative examples, the use of set of resources 418 by other services may occur when processing tasks on other services in network data processing system 404.

As depicted, program system 412 collects information 420 about service 408 and set of resources 418 in these illustrative examples. Information 420 collected by program system 412 may include, for example, configuration 424 for service 408. Configuration 424 for service 408 may include a configuration for set of resources 418 used by service 408. Information 420 collected by program system 412 may also include performance 426 of service 408 in these illustrative examples.

In these illustrative examples, program system 412 identifies change 422 to configuration 424 for service 408 to increase performance 426 of service 408. In these illustrative examples, change 422 is identified using information 420 collected by program system 412. Change 422 for configuration 424 for service 408 may be for services 402, set of resources 418 used by service 408, or both in these illustrative examples. In these illustrative examples, program system 412 may then change configuration 424 for the service using the change identified for the service.

In these illustrative examples, change 422 may be identified using repository 428. Repository 428 may be located on server computer system 430 in these illustrative examples.

As depicted, program system 412 has list of services 432. In these illustrative examples, list of services 432 may be a list of services managed by program system 412. In other words, services listed in list of services 432 are services that program system 412 manages for analysis and identification of possible configuration changes.

In these illustrative examples, service 408 is analyzed when program system 412 identifies service 408 or an output of service 408. The output of service 408 may be, for example, a result of service 408, a log for service 408, and/or a performance for service 408.

In these illustrative examples, service 408 may be managed when service 408 is selected for analysis to see if changes may be made to improve the performance of service 408. When service 408 is managed, an analysis may be made to determine whether service 408 is analyzed. In these illustrative examples, program system 412 may create list of services 432 in network data processing system 404. When program system 412 finds a service that is not in list of services 432, program system 412 may add that service to list of services 432. In these illustrative examples, program system 412 may also remove services from list of services 432 by program system 412.

In these illustrative examples, change 422 may also be identified using policy 434. Policy 434 may be defined in resource configuration environment 400. Policy 434 is a set of rules. Policy 434 may be used by program system 412 to process information 420 collected by program system 412 for identifying changes, such as change 422, to improve performance 426 of service 408. For example, service 408 may have been recently upgraded and may require a parameter change to improve performance. In this example, a rule in policy 434 may be for program system 412 to configure a parameter of a particular version of service 408. For example, the particular version of service 408 may be an upgraded version. In these illustrative examples, information 420 collected by program system 412 may be used to identify the particular version of service 408. In this illustrative example, when the particular version of service 408 is identified, program system 412 configures the parameter of service 408, thus improving the performance of service 408.

As depicted, program system 412 may use permissions 436 to determine whether change 422 can be made to configuration 424 for service 408. Permissions 436 may be defined and may be located in resource configuration environment 400. For example, a user account may be present in each computer system in network data processing system 404 that provides the permissions needed to make change 422. This user account may also be used to allow program system 412 to search for services and download program code. For example, if program system 412 is a plurality of programs, a program in program system 412 that identifies service 408 may cause another program in program system 412 to be downloaded to identify and perform change 422. Logs from this user account may be used to obtain information about activities of program system 412.

In these illustrative examples, program system 412 may use server computer system 430 to change policy 434 and permissions 436 for use by program system 412. For example, in the absence of a rule in policy 434 that identifies change 422 to improve performance 426 of service 408 that can be made according to permissions 436, program system 412 may use server computer system 430 to change one or more rules in policy 434. Additionally, in the absence of a rule in policy 434 that identifies change 422 to improve performance 426 of service 408 that can be made according to permissions 436, program system 412 may also use server computer system 430 to change one or more permissions in permissions 436.

The illustration of resource configuration environment 400 in FIG. 4 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example, although network data processing system 404 has been described with respect to cloud 406, other illustrative embodiments may be applied to other types of network data processing systems in addition to and/or in place of cloud 406. As one illustrative example, network data processing system 404 may be a local area network (LAN), a wide area network (WAN), an intranet, the Internet, or some combination thereof. As another illustrative example, list of services 432 may include a list of services managed by program system 412 and a list of services not managed by program system 412. Services not managed may be marked or flagged in the list to indicate whether a service is managed.

Figure 5:
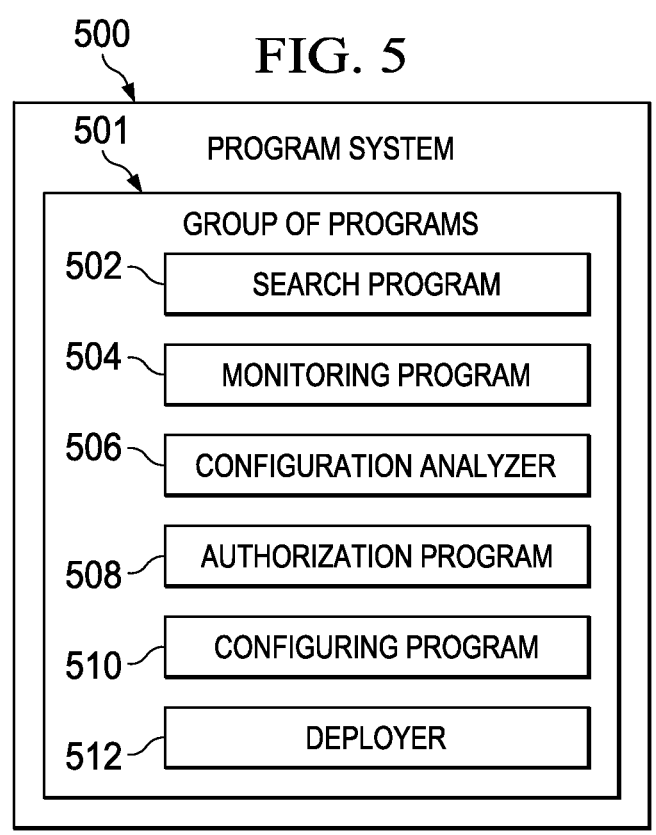
FIG. 5 is an illustration of a program system in accordance with an illustrative embodiment.

With reference now to FIG. 5, an illustration of a program system is depicted in accordance with an illustrative embodiment. Program system 500 is an illustrative example of one implementation of program system 412 running on computer system 410 in FIG. 4. In this illustrative example, program system 500 is comprised of group of programs 501. As depicted in this illustrative example, group of programs 501 includes search program 502, monitoring program 504, configuration analysis program 506, authorization program 508, configuring program 510, and deployment program 512.

Search program 502 is configured to identify a service, such as service 408 in computer system 410 in FIG. 4. In this illustrative example, search program 502 may also be configured to identify a set of resources used by the service, such as set of resources 418 in network data processing system 404 used by service 408 in FIG. 4.

In one illustrative example, search program 502 may search for services in computer systems by first searching for computer systems in the local area networks. If computer systems are in the local area networks, search program 502 may use administrative services of the computer systems to identify services in the identified computer systems in these illustrative examples. In other illustrative examples, search program 502 may communicate with computer system/server 12 in cloud computing node 10 in FIG. 1 to identify services in computer systems known to computer system/server 12.

Search program 502 may classify the types of services identified. Also, search program 502 may identify services currently being managed by program system 500 in list of services 432 as well as services not being managed by program system 500 in list of services 432 in FIG. 4 in these illustrative examples. Still further, search program 502 may identify in list of services 432 whether the service is being managed by program system 500.

In this example, monitoring program 504 monitors service 408 in FIG. 4. For example, monitoring program 504 may monitor log files for service 408 to identify warnings and errors for service 408. In these illustrative examples, monitoring program 504 may also monitor log files for set of resources 418 used by service 408.

Monitoring program 504 may also monitor performance 426 for service 408 in FIG. 4 in these illustrative examples. In these illustrative examples, monitoring program 504 may monitor service 408 to identify requests made from service 408 to set of resources 418 used by service 408. In this manner, monitoring program 504 may aid in identifying services in set of resources 418 for service 408.

Next, configuration analysis program 506 uses the information collected to identify change 422 to configuration 424 for service 408 which will increase performance 426 of service 408 in these illustrative examples. In these illustrative examples, configuration analysis program 506 may also identify a set of changes to a set of configurations for service 408 which will increase performance 426 of service 408. For example, configuration analysis program 506 may identify a first set of configuration changes to a first configuration for service 408 which will increase performance 426 of service 408 and a second set of changes to a second configuration of set of resources 418 used by service 408.

Authorization program 508 is configured to obtain permission to make change 422 to configuration 424 for service 408. Authorization program 508 may use permissions 436 to determine whether change 422 can be made to configuration 424 for service 408 as depicted in FIG. 4. If change 422 can be made, authorization program 508 performs steps needed to allow for change 422 to be made. For example, authorization program 508 may perform steps to login to a user account. These steps may include initiating a login process and then providing a user identifier and password. Authorization program 508 may then change permissions 436 for the resource to allow the resource be changed if needed.

Configuring program 510 makes change 422 to service 408, set of resources 418, or both. Change 422 made by configuring program 510 may be, for example, changing a configuration file, changing resources in set of resources 418 that are accessible by service 408, other services in set of resources 418, or both.

Additionally, when search program 502 identifies services that that are in set of resources 418 that are located on another computer system, search program 502 may cause the deployment of a program system on that computer system. In this manner, one or more illustrative embodiments may replicate program systems on a network to find resources that may affect the performance of service 408 that are not located on computer system 410.

Further, search program 502 also may find services on a computer system that does not currently have program system 500. Search program 502 may cause the deployment of a program system, such as program system 500, to such computer systems in the environment for analyzing services. For example, after deployment of program system 500 to computer systems that did not previously have program system 500, program system 500 will then be able to analyze the services directly on these computer systems.

In these illustrative examples, program system 500 may include deployment program 512 in group of programs 416 in computer system 410. Information about managed services may be used to identify changes that may increase performance 426 of those services. With this information, proposals may be made to an organization that runs the services to provide consulting to improve their services.

The illustrative example of program system 500 is not meant to imply physical or architectural limitations to the manner in which an illustrative embodiment may be implemented. Other programs in addition to and/or in place of the ones illustrated may be used. Some programs may be unnecessary. For example, configuration analysis program 506 may be omitted from program system 500. This function may be provided as a separate function in server computer system 430 in FIG. 4. As another example, a service modification program may be included that modifies service 408 by inserting code into service 408 to measure performance 426 of service 408.

Also, one or more of these programs may be combined, divided, or combined and divided into different programs when implementing an illustrative embodiment. The programs may also be implemented on other computer systems in resource configuration environment 400. For example, one or more programs in program system 500 may be implemented in server computer system 430 in FIG. 4.

Figure 6:
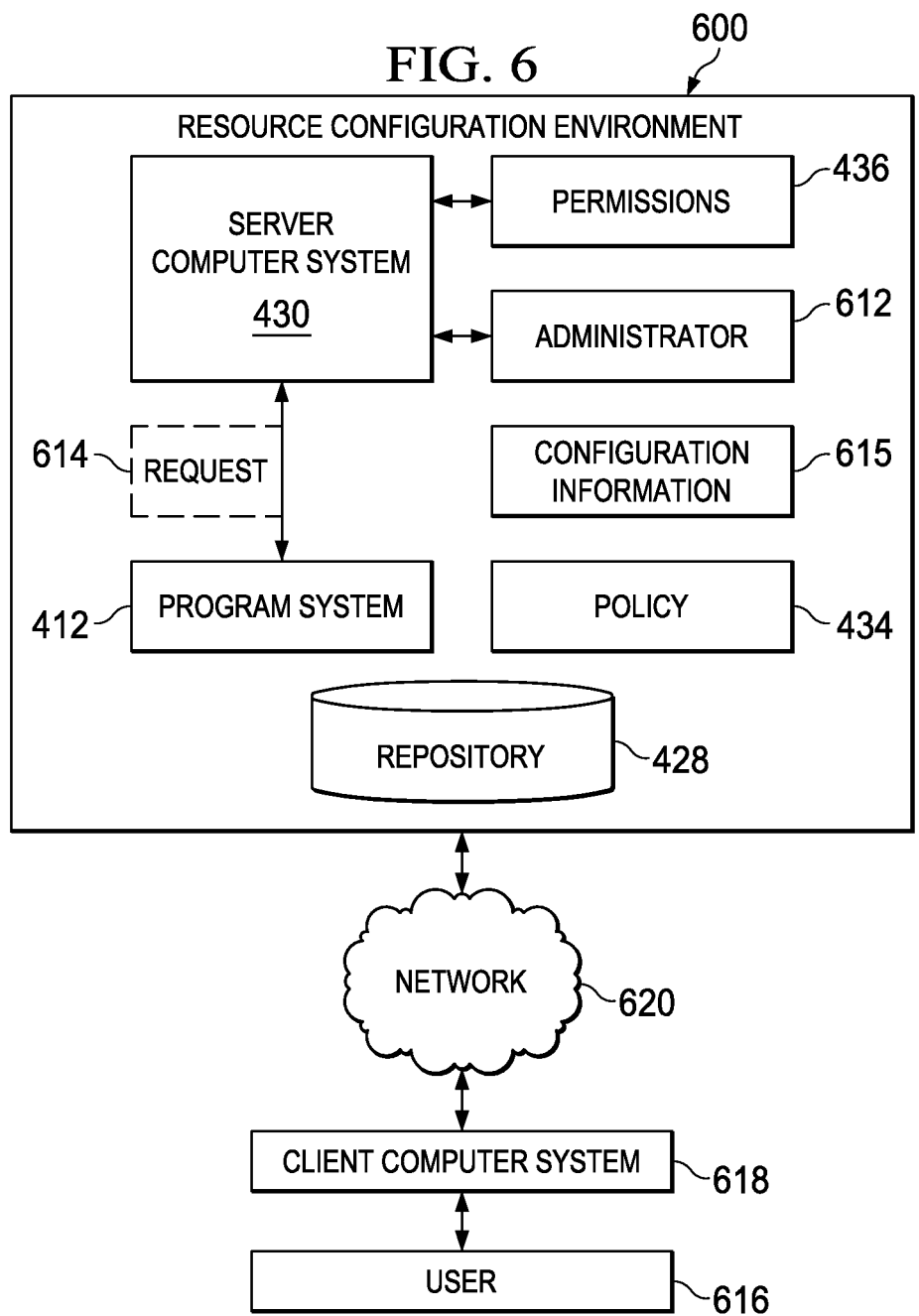
FIG. 6 is a block diagram illustrating components involved in managing the operations of a program system in a resource configuration environment in accordance with an illustrative embodiment.

Turning now to FIG. 6, a block diagram illustrating components for managing the operations of a program system in a resource configuration environment is depicted in accordance with an illustrative embodiment. Resource configuration environment 600 is an illustrative example of resource configuration environment 400 in FIG. 4. FIG. 6 illustrates operations that may be performed by an administrator to configure a program system and to authorize the program system to perform tasks in the resource configuration environment.

As depicted, administrator 612 in resource configuration environment 600 uses server computer system 430 to modify and approve permissions 436 in these illustrative examples. For example, server computer system 430 may receive request 614 from program system 412 for permission to make a change to a configuration for a service to improve performance of the service. In this illustrative example, responsive to server computer system 430 receiving request 614, administrator 612 may be presented with a graphical user interface configured for allowing or denying permission to make the change.

In these illustrative examples, when a permission is given for a task, an authorization is present to perform the task. For example, before a program in a program system can restart a computer or modify a configuration for a service, the program in the program system may first be required to have authorization in the form of a permission.

In these illustrative examples, administrator 612 also uses server computer system 430 in resource configuration environment 600 to create, update, and delete particular rules in policy 434. For example, administrator 612 may use a graphical display for server computer system 430 particularly configured to create, update, and delete one or more rules in policy 434. These changes to the rules may be made to improve performance of a service.

For example, one rule may be to increase a buffer size for use by a service when a buffer limit has been reached. In this example, the program system may identify that the buffer limit has been reached in an error log generated by a platform that is executing the service. Another rule may be to reduce a number of concurrent requests that can be processed by a service when a central processing unit that is executing the service has a performance indicating that the central processing unit use is over a particular threshold. These illustrative examples are not meant to limit the number of rules in policy 434, the types of rules in policy 434, or the types of changes the rules are for in policy 434. For example, rules in policy 434 may also be for improving performance of the services used by a service. In still other examples, rules in policy 434 may also be for improving the resources used by service 408 in FIG. 4. Further, any rule suitable for improving performance of a component in resource configuration environment 600 or outside of resource configuration environment 600 may be used in these illustrative examples.

As depicted, administrator 612 further uses server computer system 430 to retrieve information stored in repository 428 in these illustrative examples. For example, administrator 612 may use a graphical display for server computer system 430 particularly configured to show information in repository 428 about services collected by program system 412, such as performance and configuration, and suggest configuration changes for improving service performance.

As depicted, administrator 612 also creates and edits configuration information 615. In these illustrative examples, configuration information 615 may include configuration information for program system 412. For example, administrator 612 may edit configuration information 615 to define how often the operations in program system 412 are performed.

In these illustrative examples, user 616 may use client computer system 618 over network 620 to communicate with server computer system 430 to use services running on computer system 410 as depicted in FIG. 4.

Additionally, in some illustrative examples, user 616 may also log into server computer system 430 as administrator 612 to perform the work of the administrator from a computer system that is not in resource configuration environment 600. In this particular example, client computer system 618 may communicate with server computer system 430 using secure communications, such as communicating over a virtual private network formed between client computer system 618 and server computer system 430 over network 620.

Figure 7:
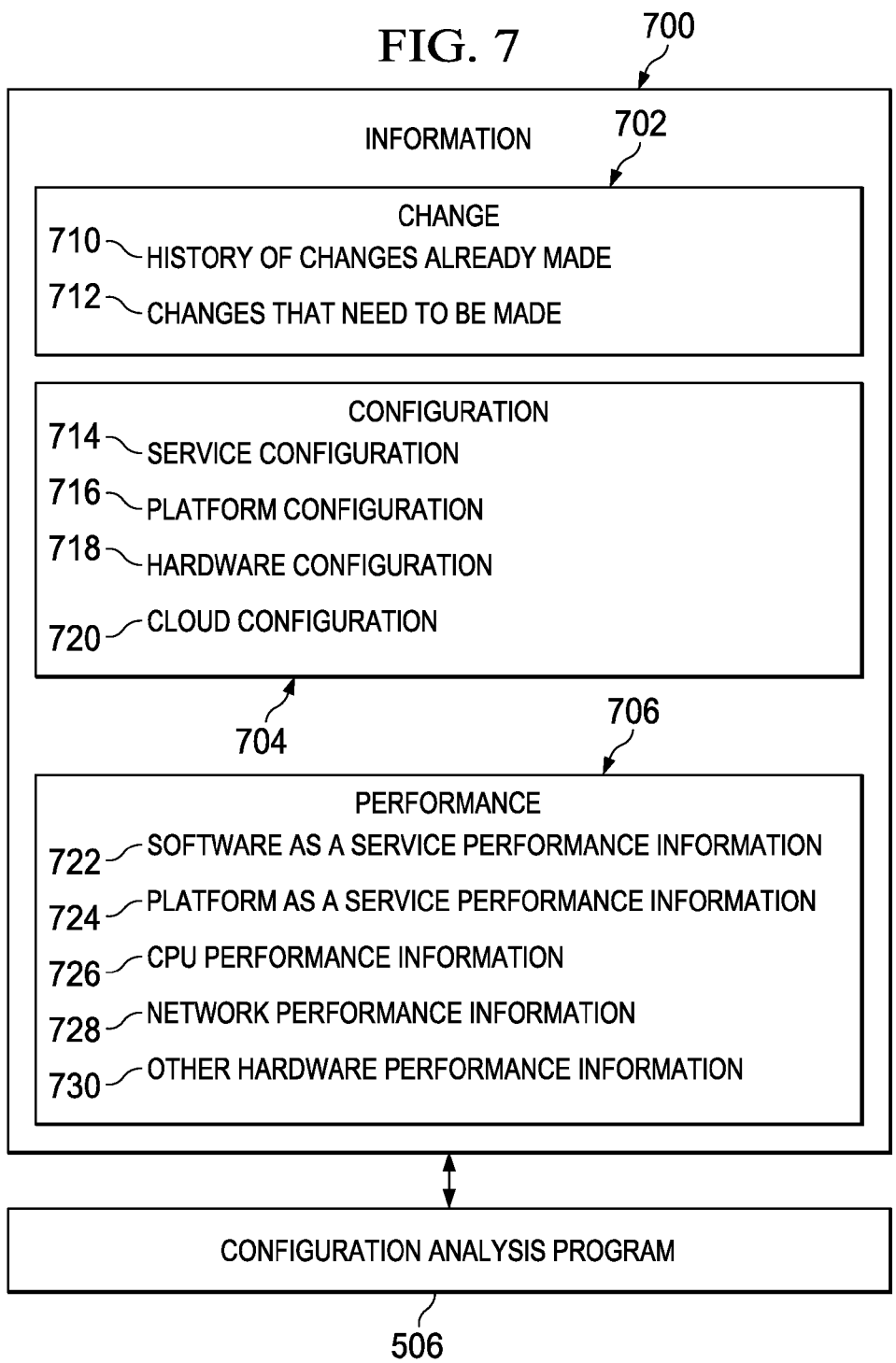
FIG. 7 is a figure of an example of information that is identified by a computer system in accordance with an illustrative embodiment.

Turning next to FIG. 7, a figure of an example of information that is identified by a computer system is depicted in accordance with an illustrative embodiment. Information 700 is an illustrative example of information 420 in resource configuration environment 400 in FIG. 4.

Change 702 in information 700 is an illustrative example of change 422 in FIG. 4. Configuration 704 in information 700 is an illustrative example of configuration 424 in FIG. 4. Performance 706 in information 700 is an illustrative example of performance 426 in FIG. 4 in these illustrative examples.

As depicted, change 702 in information 700 may include history of changes already made 710 and changes that need to be made 712 in these illustrative examples. Changes that need to be made 712 may include information from log files generated by services in computer systems in the environment in these illustrative examples. For example, changes that need to be made 712 may include information for a service in a computer system indicating the service in the computer system is being restarted a particular number of times.

In this example, information for the service may include a log of information for the service. The log may be an error log generated by the computer system indicating a number of restarts of the service and other error information. This log is used by configuration analysis program 506 in FIG. 5 to identify a configuration change for the service to improve performance for the service. In these illustrative examples, when configuration analysis program 506 identifies that a number of restarts of a service exceed a threshold, configuration analysis program 506 may use information 700 to identify a change to a configuration for the service which will increase performance of the service. For example, configuration analysis program 506 may identify change 422 using a set of rules in policy 434 in resource configuration environment 400 to process information 700 to improve performance 426 of service 408 as depicted in FIG. 4.

In these illustrative examples, history of changes already made 710 may also be used to determine a change to a configuration for a service which will increase performance of the service. For example, responsive to configuration analysis program 506 determining a change to a configuration for a service that has already been made, configuration analysis program 506 may use information 700 to determine if further changes to the configuration for the service are necessary. In this example, configuration analysis program 506 may determine whether the changes previously made should be undone to return the configuration for the service to a previous configuration that performed better than the current configuration.

In these illustrative examples, configuration 704 may include service configuration 714, platform configuration 716, hardware configuration 718, and cloud configuration 720. In these illustrative examples, configuration 704 may also be used to identify a change to a configuration for a service that increases performance of the service. For example, responsive to configuration analysis program 506 determining that a change is needed to a configuration for a service to improve performance for the service, configuration analysis program 506 may wait for the change to be made in configuration 704 before determining whether a second change is necessary.

As depicted, performance 706 may include software as a service performance information 722, platform as a service performance information 724, central processing unit (CPU) performance information 726, network performance information 728, and other hardware performance information 730 in these illustrative examples. In these illustrative examples, performance 706 may also be used to determine a change to a configuration for a service which will increase performance of the service. For example, policy 434 in resource configuration environment 400 in FIG. 4 may be used by configuration analysis program 506 to process software as a service performance information 722, platform as a service performance information 724, central processing unit performance information 726, network performance information 728, and other hardware performance information 730 to determine a change to a configuration for a service which will increase performance of the service.

Figure 8:
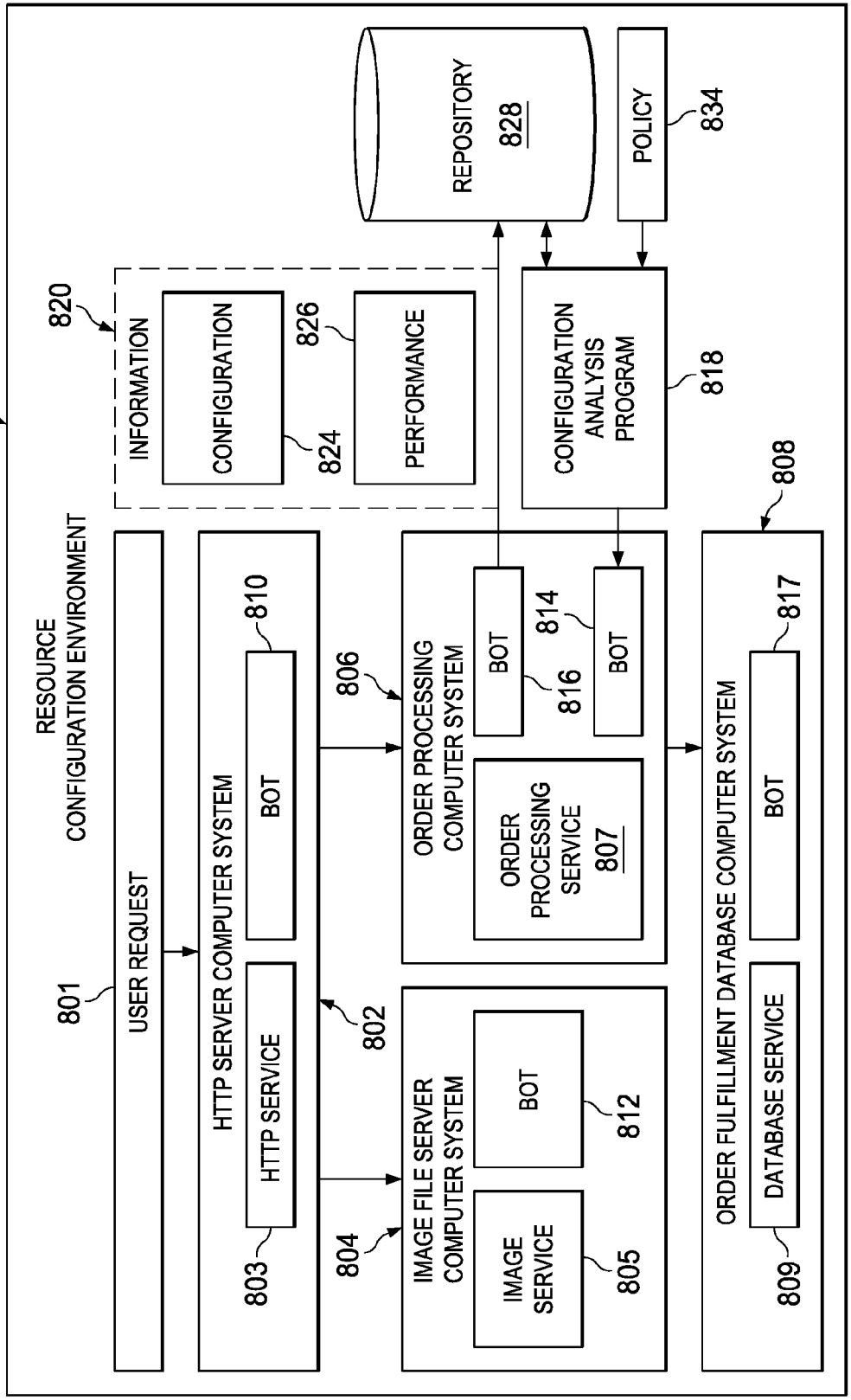
FIG. 8 is a block diagram of components involved in managing a service in accordance with an illustrative embodiment.

In FIG. 8, a block diagram of components involved in managing a service is depicted in accordance with an illustrative embodiment. Resource configuration environment 800 is an example of one implementation of resource configuration environment 400 in FIG. 4.

As depicted, user request 801 is received by hypertext transport protocol (HTTP) service 803 on hypertext transport protocol server computer system 802 in this illustrative example. Hypertext transport protocol service 803 processes user request 801 by making a first request to image service 805 on image file server computer system 804. This first request is for information retrieval from image file server computer system 804 in this illustrative example. As depicted, image file server computer system 804 has storage resources for storing and retrieving information that are accessed by image service 805. Hypertext transport protocol service 803 also processes user request 801 by sending an order for user request 801 to order processing service 807 on order processing computer system 806.

As depicted, order processing service 807 then receives the order for user request 801 from hypertext transport protocol service 803. In this illustrative example, order processing service 807 processes the order for user request 801 using service 408 in FIG. 4. For example, order processing service 807 processes the order using database service 809 on order fulfillment database computer system 808. As depicted, order fulfillment database computer system 808 has database resources for storing, retrieving, and fulfilling orders.

As depicted, some computer systems in this illustrative example are configured with a bot for use in improving performance for the processing of user request 801. In this illustrative example, bot 810 is located in hypertext transport protocol server computer system 802, bot 812 is located in image file server computer system 804, bot 814 and bot 816 are located in order processing computer system 806, and bot 817 is located on order fulfillment database computer system 808. In this illustrative example, bot 810, bot 812, bot 814, bot 816, and bot 817 provide information to repository 828. In other illustrative examples, bot 810, bot 812, bot 814, bot 816, and bot 817 also provide information to computer system/server 12 in cloud computing node 10 in FIG. 1. This information is used to identify changes for improving performance of the processing of user request 801. In particular, bot 816 provides configuration 824 for order processing service 807 and performance 826 of order processing service 807 in the form of information 820 to repository 828.

In these illustrative examples, some bots may not be present or they may be present in a different computer system. For example, if bot 816 is not present in order processing computer system 806, some other means may be used to identify changes to improve service performance. For example, the use of order processing service 807 by other services may provide enough information about order processing service 807. If enough information is not present to improve service performance sufficiently, then the program system may identify that bot 816 needs to be deployed to order processing computer system 806.

In this illustrative example, configuration analysis program 818 retrieves information from repository 828 and determines that a performance problem exists between order processing service 807 and order fulfillment database computer system 808. For example, responsive to retrieving information 820, configuration analysis program 818 may process information 820 using policy 834. While processing information 820 using policy 834, configuration analysis program 818 may determine that a performance problem exists for order processing service 807 in information 820.

For example, according to policy 834, if particular values in information 820 exceed a threshold, a performance problem exists for order processing service 807. In this illustrative example, while processing information 820 using policy 834, configuration analysis program 818 may determine a particular change is required for configuration 824 for order processing service 807 for improving performance 826 of order processing service 807.

Responsive to determining the particular change to configuration 824 for improving performance 826 of order processing service 807, configuration analysis program 818 sends the particular configuration change to bot 814 in order processing computer system 806. In this illustrative example, bot 814 receives the particular change and is configured to make the particular change to configuration 824 for order processing service 807. In this illustrative example, when the particular change is received, bot 814 makes the particular change to configuration 824 for order processing service 807 for improving performance 826 of order processing service 807. Thus, performance 826 of order processing service 807 is improved, which in turn also improves the performance in processing of user requests such as user request 801.

Figure 9:
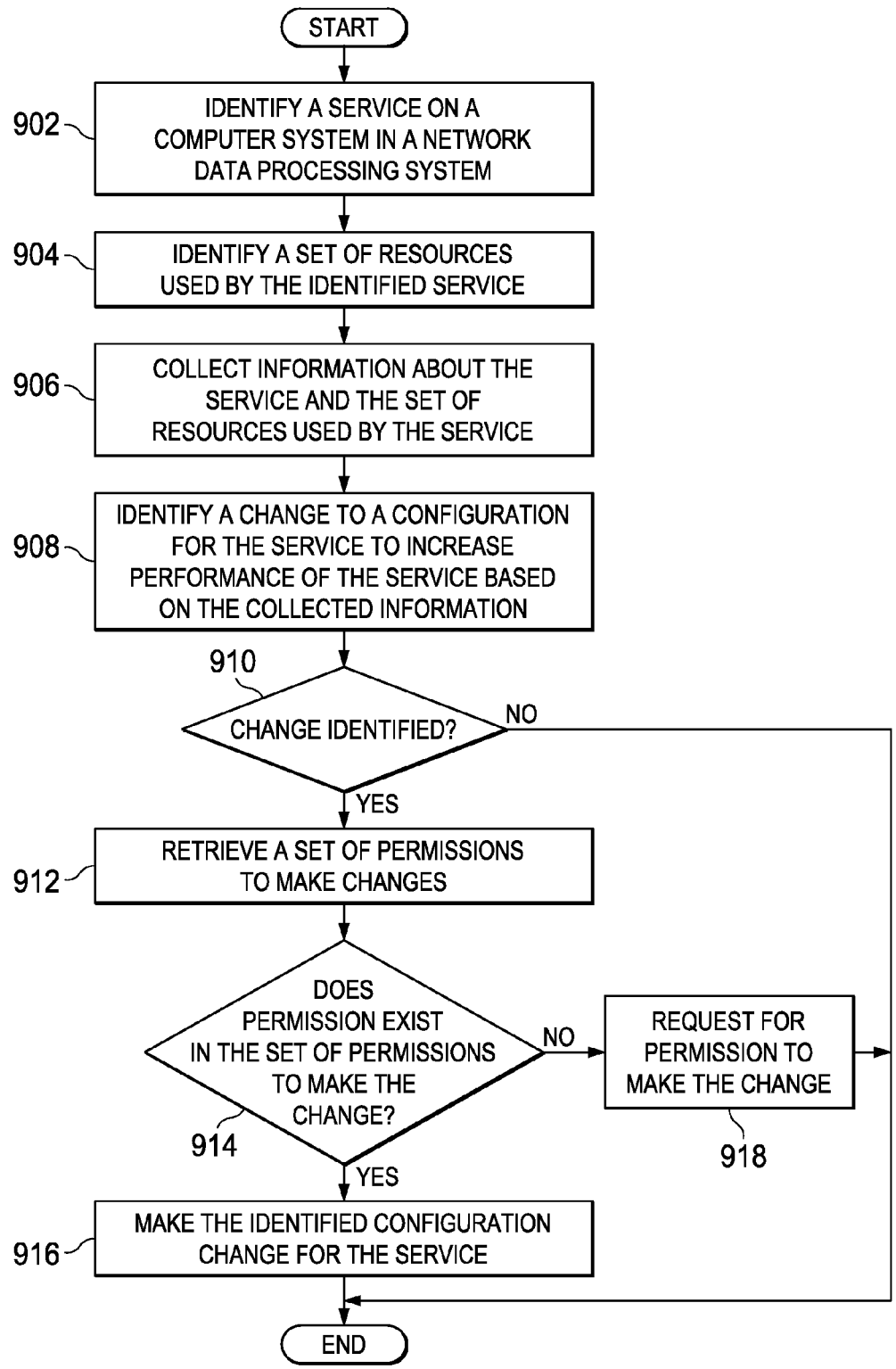
FIG. 9 is a flowchart of a process for managing a service in accordance with an illustrative embodiment.

With reference now to FIG. 9, an illustrative example of a flowchart of a process for managing a service is depicted in accordance with an illustrative embodiment. The steps in FIG. 9 may be implemented in resource configuration environment 400 in FIG. 4. In particular, the steps may be implemented in software, hardware, or a combination of the two in program system 412 in computer system 410 in resource configuration environment 400 in FIG. 4. Still more particularly, the steps may be implemented by search program 502, monitoring program 504, configuration analysis program 506, authorization program 508, and configuring program 510 in FIG. 5.

The process begins by identifying a service on a computer system in a network data processing system (step 902). In this illustrative example, the service may be identified by search program 502. For example, search program 502 may identify service 408 in computer system 410 in FIG. 4.

The process then identifies a set of resources used by the identified service (step 904). In this illustrative example, the set of resources used by the identified service may be also identified by search program 502. For example, search program 502 may identify set of resources 418 in use by service 408 in computer system 410 in network data processing system 404 in FIG. 4.

The process collects information about the service and the set of resources used by the service (step 906). In this illustrative example, the information collected may be collected by search program 502 and by monitoring program 504. The information collected in this illustrative example may include history of changes already made 710, changes that need to be made 712, service configuration 714, platform configuration 716, hardware configuration 718, cloud configuration 720, software as a service performance information 722, platform as a service performance information 724, central processing unit performance information 726, network performance information 728, and other hardware performance information 730 in FIG. 7, and any other information in resource configuration environment 400 suitable for identifying a change to a configuration for the service to increase performance of the services.

The process identifies a change to a configuration for the service to increase performance of the service based on the collected information (step 908). In this illustrative example, the change to the configuration for the service to increase performance of the services based on the collected information may be identified by configuration analysis program 506 in FIG. 5.

The process then determines if a change was identified to a configuration for the service to increase performance of the services based on the collected information (step 910). If a change to a configuration for the service to increase performance of the services based on the collected information was not identified, the process terminates. If a change to a configuration for the service to increase performance of the services based on the collected information was identified, the process retrieves a set of permissions to make changes (step 912). In this illustrative example, the set of permissions may be permissions 436 in resource configuration environment 400 in FIG. 4.

The process determines if permission exists in the set of permissions to make the change to the configuration for the service to increase performance of the services based on the collected information (step 914). In this illustrative example, the determination of whether the permission exists in the set of permissions may be made by authorization program 508 in FIG. 5. If the permission does not exist in the set of permissions, the process requests permission to make the change (step 918) with the process terminating thereafter. In other illustrative examples, in response to the permission not existing, the process may go to step 918 to request permission and then responsive to receiving the permission may continue to step 916 (not shown).

Responsive to the permission existing to make the change, the process makes the identified change to the configuration for the service to increase performance of the services based on the collected information (step 916) with the process terminating thereafter. In this illustrative example, the identified change to the configuration for the service to increase performance of the services based on the collected information may be made by configuring program 510 in FIG. 5.

In these illustrative examples, the steps in FIG. 9 may be performed periodically. For example, configuration information 615 in FIG. 6 for program system 412 may be used to determine how long to wait before repeating the steps in FIG. 9.

Figure 10:
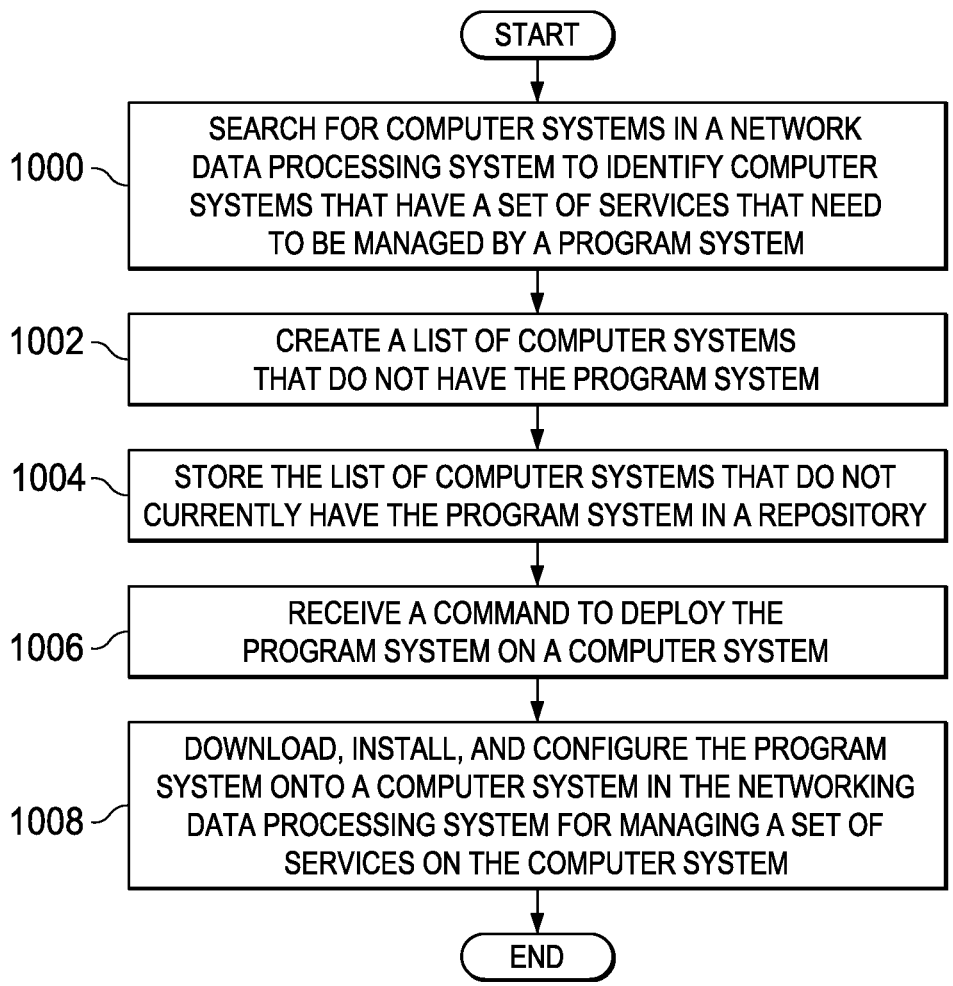
FIG. 10 is a flowchart of a process for managing a service in accordance with an illustrative embodiment.

Turning next to FIG. 10, an illustrative example of a flowchart of a process for managing a service is depicted in accordance with an illustrative embodiment. The steps in FIG. 10 may be implemented in resource configuration environment 400 in FIG. 4. In particular, the steps may be implemented in software, hardware, or a combination of the two in program system 412 in computer system 410 in FIG. 4. Still more particularly, the steps may be implemented by search program 502 and deployment program 512 in FIG. 5. As depicted, FIG. 10 performs a number of steps which identify computer systems for deployment of a program system to the computer systems for analyzing and managing services on the computer systems.

The process begins by searching for computer systems in a network data processing system to identify computer systems that have a set of services that need to be managed by program system 412 (step 1000). The process then creates a list of computer systems that do not have program system 412 (step 1002). For example, search program 502 may create a list of computer systems that do not have program system 412 as depicted in FIG. 4. In this example, when searching for computer systems, search program 502 may add each computer system found that does not already have program system 412 to a list of computer systems that do not have program system 412.

Also, search program 502 may first identify if there are a set of services on each computer system that need to be managed by program system 412 before adding each computer system to the list. For example, program system 412 may support managing services of a particular type. In this example, program system 412 may perform a check on the computer system for services of the particular type before adding the computer system to the list. In still other examples, all computer systems found by search program 502 may be added to the list by search program 502. In these illustrative examples, search program 502 may also add to the list an indication regarding the services and types of services found on each computer system that does not currently have program system 412.

The process then stores the list of computer systems that do not currently have program system 412 (step 1004). In this illustrative example, search program 502 may store the list of computer systems that do not have program system 412 in repository 428 in resource configuration environment 400 in FIG. 4.

The process receives a command to deploy a program system on a computer system to manage one or more services on the computer system (step 1006). In this illustrative example, the command to deploy the program system may be received from server computer system 430 in resource configuration environment 400 in FIG. 4. For example, the command to deploy the program system may be a command to deploy bot 414 in group of programs 416 in program system 412 on computer system 410 in FIG. 4. In other examples, the process may receive a command to deploy a set of programs in group of programs 416 in program system 412 on computer system 410 which are particularly configured to manage one or more services on computer system 410.

Responsive to receiving the command, the process may download, install, and configure the program system onto a computer system in the network data processing system for managing a set of services on the computer system (step 1008) with the process terminating thereafter. In this illustrative example, the download, install, and configure steps may be performed by deployment program 512. In this illustrative example, responsive to receiving the command to deploy bot 414 in group of programs 416 in program system 412 on computer system 410, deployment program 512 may download, install, and configure bot 414 in group of programs 416 on computer system 410 for analyzing one or more services on computer system 410. In other examples, responsive to receiving the command to deploy a set of programs, the process may download, install, and configure the set of programs onto a computer system in the network data processing system for managing the one or more services of the set of services not currently being managed.

Figure 11:
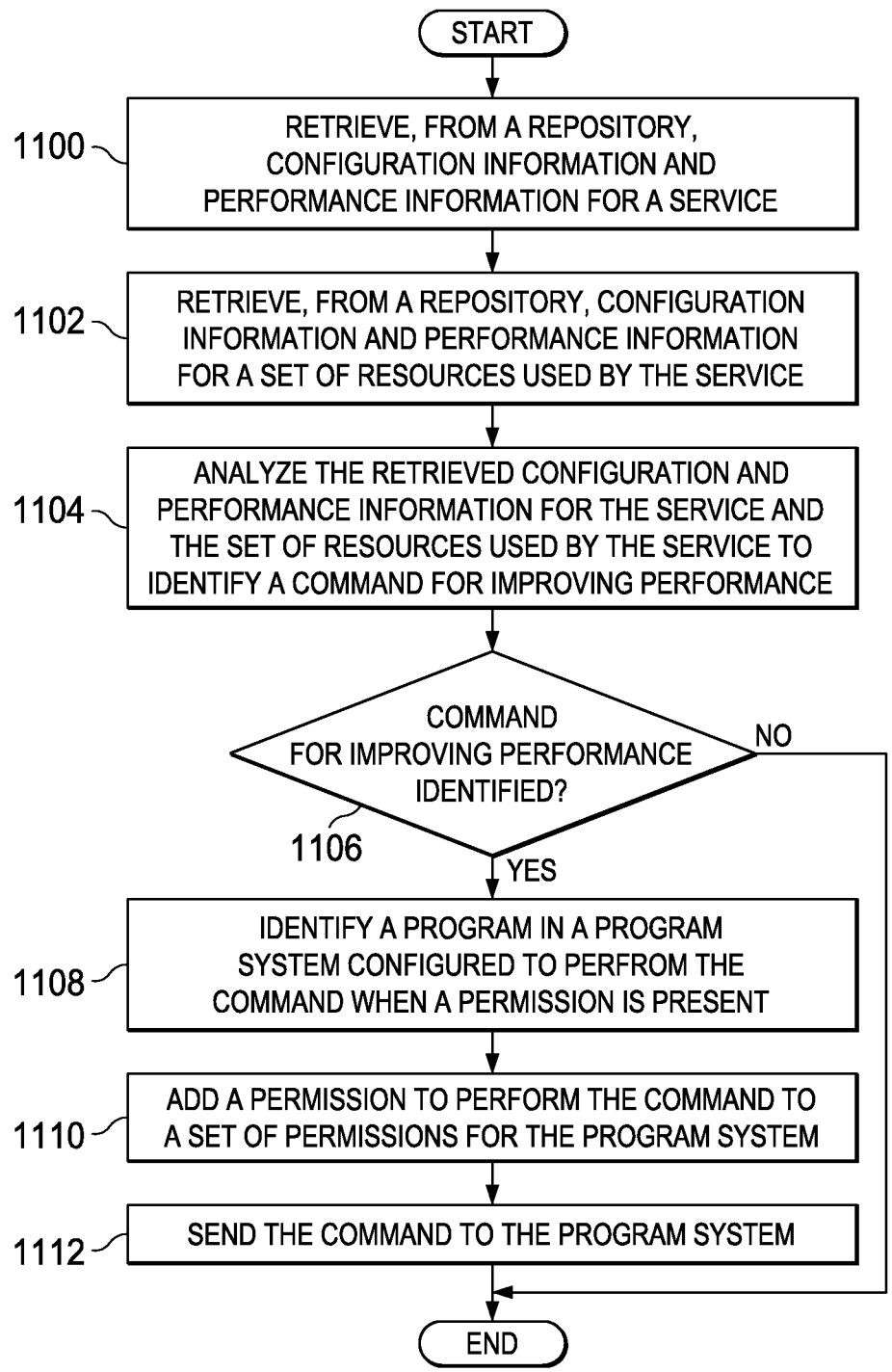
FIG. 11 is a flowchart of a process for managing a service in accordance with an illustrative embodiment.

In FIG. 11, an illustrative example of a flowchart of a process for managing a service is depicted in accordance with an illustrative embodiment. The steps in FIG. 11 may be implemented in resource configuration environment 400 in FIG. 4. In particular, the steps may be implemented in software, hardware, or a combination of the two in server computer system 430 in FIG. 4. Still more particularly, the steps may be implemented by configuration analysis program 506 in FIG. 5 on server computer system 430.

The process begins by retrieving, from a repository, configuration information and performance information for a service (step 1100). In this illustrative example, configuration analysis program 506 on server computer system 430 retrieves information 420, comprising configuration 424 and performance 426 information for service 408, from repository 428 in FIG. 4.

The process then retrieves, from the repository, configuration information and performance information for a set of resources used by the service (step 1102). In this illustrative example, configuration analysis program 506 on server computer system 430 retrieves from repository 428 information 420 collected and stored by program system 412 in FIG. 4. Information 420 retrieved from repository 428 may include history of changes already made 710, changes that need to be made 712, service configuration 714, platform configuration 716, hardware configuration 718, cloud configuration 720, software as a service performance information 722, platform as a service performance information 724, central processing unit performance information 726, network performance information 728, and other hardware performance information 730 in FIG. 7, and any other information suitable for identifying a change to a configuration for the service to increase performance of the service.

The process analyzes the retrieved configuration and performance information for the service and the set of resources used by the service to identify a command for improving performance (step 1104). In this illustrative example, the command for improving performance may be a command for improving performance 426 of service 408 in computer system 410 based on the retrieved information from repository 428 in FIG. 4. For example, the identified command for improving performance 426 of service 408 in computer system 410 may be identified by configuration analysis program 506 on server computer system 430.

The process then determines if a command was identified for improving performance (step 1106). If a command for improving performance was not identified, the process terminates. Responsive to identifying the command for improving performance, the process identifies a program in a program system configured to perform the command when a permission is present (step 1108). In this illustrative example, configuration analysis program 506 identifies a program in program system 412 configured to perform the command based on group of programs 416 in program system 412 in resource configuration environment 400 in FIG. 4. For example, configuration analysis program 506 may identify bot 414 in FIG. 4 in group of programs 416 to perform the command based on bot 414 being identified in group of programs 416 as being able to perform the identified command.

The process adds a permission to perform the command to a set of permissions for the program system (step 1110). In this illustrative example, configuration analysis program 506 adds a permission to perform the command to a set of permissions for program system 412 based on permissions 436 in resource configuration environment 400 in FIG. 4. For example, configuration analysis program 506 may identify permissions of program system 412 in permissions 436 in FIG. 4 for executing the command being identified in group of programs 416. If the permission in permissions 436 for executing the command is absent, configuration analysis program 506 may add the permission to permissions 436 for executing the command by storing the permission in permissions 436. The process sends the command to the program system (step 1112), with the process terminating thereafter.

In these illustrative examples, the steps in FIG. 11 may be performed periodically. For example, configuration information 615 in FIG. 6 for program system 412 may be used to determine how long to wait before repeating the steps in FIG. 11.

Figure 12:
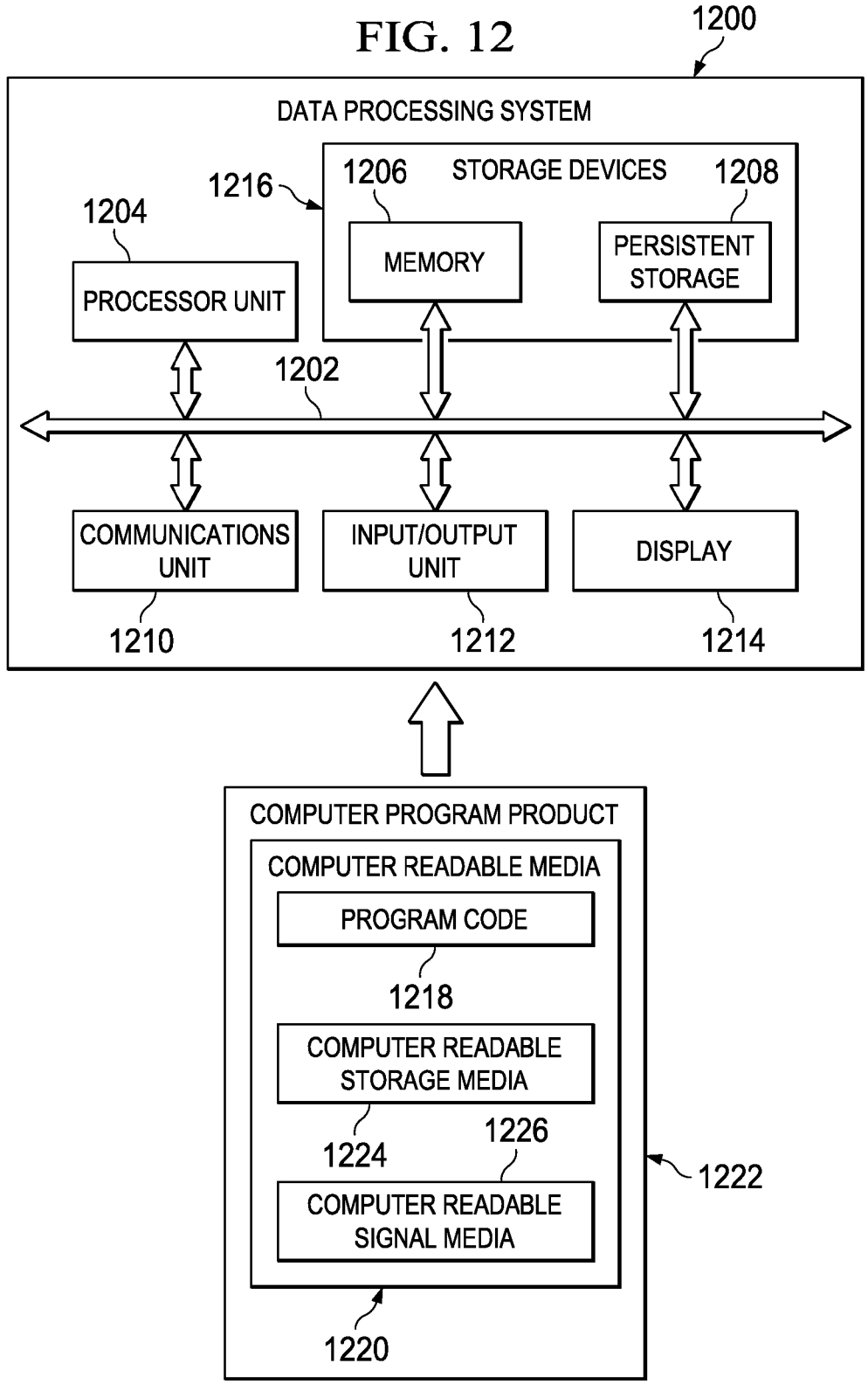
FIG. 12 is an illustration of a data processing system in accordance with an illustrative embodiment.

Turning now to FIG. 12, an illustration of a data processing system is depicted in accordance with an illustrative embodiment. In this illustrative example, data processing system 1200 includes communications fabric 1202, which provides communications between processor unit 1204, memory 1206, persistent storage 1208, communications unit 1210, input/output (I/O) unit 1212, and display 1214. Data processing system 1200 is an example of a data processing system that may be used to implement managing a service in a network data processing system. Data processing system 1200 is also an example of a data processing system that may be used to implement computer system/server 12 and cloud computing nodes such as cloud computing node 10 in FIG. 1. Data processing system 1200 also may be used to implement personal digital assistant (PDA) or cellular telephone 54A, desktop computer 54B, laptop computer 54C, automobile computer system 54N, and other local computing devices used by cloud consumers in FIG. 2. Data processing system 1200 may also be used to implement the hardware and software components of hardware and software layer 60 in FIG. 3. More particularly, data processing system 1200 may be used to implement server computer system 430 and computer system 410 in FIG. 4; client computer system 618 in FIG. 6; and hyper text transport server computer system 802, image file server computer system 804, order processing computer system 806, and order fulfillment database computer system 808 in FIG. 8.

Processor unit 1204 serves to process instructions for software that may be loaded into memory 1206. Processor unit 1204 may be a number of processors, a multi-processor core, or some other type of processor, depending on the particular implementation. "A number," as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multiprocessor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for processing by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and processed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for processing by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200.

In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, a remote data processing system, or some other device capable of storing and transmitting program code 1218. For example, program code stored in the computer readable storage medium in data processing system 1200 may be downloaded over a network from the remote data processing system to the computer readable storage medium in data processing system 1200. Additionally, program code stored in the computer readable storage medium in the server computer may be downloaded over the network from the server computer to a computer readable storage medium in the remote data processing system.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or transmit and receive data. Communications unit 1210 may be, for example, a modem or a network adapter, two network adapters, or some combination thereof. Further, a memory may be, for example, memory 1206, or a cache, such as found in an interface and memory controller hub that may be present in communications fabric 1202.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for managing a service in a network data processing system. In one example, a program runs in a computer system and identifies a service on the computer system in the network data processing system. The program identifies a set of resources used by the service. The program collects information about the service and the set of resources. The program identifies a change to the configuration for the service to increase performance of the service in which the changes identified using the information collected by the program.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application, or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer comprising:
    a bus;
    a processor unit connected to the bus;
    a computer readable storage device connected to the bus; and
    program code for managing a service, wherein the program code is stored on the computer readable storage device and is configured to be run by the processor unit to:
    identify, by a set of bots running on the computer, the service on the computer;
    identify, by the set of bots running on the computer, a set of resources used by the service;
    collect, by the set of bots running on the computer, information about the service and the set of resources used by the service;
    identify, by the set of bots running on the computer, a change to a configuration for the service to increase performance of the service, wherein the change is based, at least in part, upon the information collected by the set of bots; and
    change, by the set of bots running on the computer, the configuration for the service using the change identified for the service.

2. The computer of claim 1, wherein a first bot in the set of bots performs a step from one of:
    identifying, by the set of bots running on the computer, the service on the computer;
    identifying, by the set of bots running on the computer, the set of resources used by the service;
    collecting, by the set of bots running on the computer, the information about the service and the set of resources used by the service;
    identifying, by the set of bots running on the computer, the change to the configuration for the service to increase the performance of the service, wherein the change is identified using the information collected by the set of bots; and
    changing, by the set of bots running on the computer, the configuration for the service using the change identified for the service, while a second bot in the set of bots performs a different step from one of:
    identifying, by the set of bots running on the computer, the service on the computer;

identifying, by the set of bots running on the computer, the set of resources used by the service;

collecting, by the set of bots running on the computer, the information about the service and the set of resources used by the service, wherein the information collected further including a history of changes already made and changes that need to be made;

identifying, by machine logic, the change to the configuration for the service to increase the performance of the service, wherein the change is identified using the information collected by the set of bots; and changing, by machine logic, the configuration for the service using the change identified for the service.

3. The computer of claim 1, wherein a first bot in the set of bots running on the computer causes another bot in the set of bots to be downloaded to the computer while managing the service.

4. The computer of claim 1, wherein the change is identified using the information collected by the set of bots running on the computer and a policy for increasing performance of the service, and wherein the information collected including the changes that need to be made further including information from log files generated by services in the computer.

5. A computer program product for managing a service, the computer program product comprising:

a computer readable storage device;

first program code for a set of bots for identifying the service on a computer system in a network data processing system;

second program code for the set of bots for identifying a set of resources used by the service;

third program code for the set of bots for collecting information about the service and the set of resources used by the service, wherein the information collected further including a history of changes already made and changes that need to be made;

fourth program code for identifying a change to a configuration for the service to increase performance of the service, wherein the change is based, at least in part, upon the information collected by the set of bots; and fifth program code for changing the configuration for the service using the change identified for the service, wherein the first program code, the second program code, the third program code, the fourth program code, and the fifth program code are stored on the computer readable storage device.

6. The computer program product of claim 5, wherein a first bot in the set of bots running on the computer system causes another bot in the set of bots to be downloaded to the computer system while managing the service in the network data processing system.

7. The computer program product of claim 5, wherein the computer readable storage device is in a data processing system, and the program code is downloaded over a network from a remote data processing system to the computer readable storage device in the data processing system.

8. The computer program product of claim 7, wherein the computer readable storage device is a first computer readable storage device, and wherein the first computer readable storage device is in a server data processing system, and wherein the program code is downloaded over the network to the remote data processing system for use in a second computer readable storage device in the remote data processing system.

* * * * *